United States Patent
Stalke et al.

(10) Patent No.: US 12,352,911 B2
(45) Date of Patent: Jul. 8, 2025

(54) SCINTILLATION CUVETTE FOR MEASURING IONISING RADIATION, MEASURING DEVICE FOR MEASURING IONISING RADIATION, METHOD FOR MEASURING IONISING RADIATION

(71) Applicants: Helmholtz-Zentrum Dresden-Rossendorf E.V., Dresden (DE); VKTA—Strahlenschutz Anal YTIK & Entsorgung Rossendorf E. V., Dresden (DE)

(72) Inventors: Sebastian Stalke, Dresden (DE); Robin Steudtner, Dresden (DE); Kay Grossmann, Dresden (DE)

(73) Assignees: HELMHOLTZ-ZENTRUM DRESDEN-ROSSENDORF E.V., Dresden (DE); VKTA—STRAHLENSCHUTZ ANALYTIK & ENTSORGUNG ROSSENDORF E. V., Dresden (DE)

( * ) Notice: Subject to any disclaimer, the term of this patent is extended or adjusted under 35 U.S.C. 154(b) by 341 days.

(21) Appl. No.: 17/908,004

(22) PCT Filed: Mar. 2, 2021

(86) PCT No.: PCT/EP2021/055094
§ 371 (c)(1),
(2) Date: Aug. 30, 2022

(87) PCT Pub. No.: WO2021/175802
PCT Pub. Date: Sep. 10, 2021

(65) Prior Publication Data
US 2023/0086555 A1    Mar. 23, 2023

(30) Foreign Application Priority Data
Mar. 2, 2020 (DE) .......................... 102020202654.8

(51) Int. Cl.
*G01T 7/02* (2006.01)
*G01T 1/20* (2006.01)
*G01T 1/204* (2006.01)

(52) U.S. Cl.
CPC .............. *G01T 7/02* (2013.01); *G01T 1/2002* (2013.01); *G01T 1/2018* (2013.01); *G01T 1/204* (2013.01)

(58) Field of Classification Search
None
See application file for complete search history.

(56) References Cited

U.S. PATENT DOCUMENTS 3,898,463 A * 8/1975 Noakes ................... G01T 1/204
                                                    250/369
4,788,436 A   11/1988 Koechner
            (Continued)

OTHER PUBLICATIONS

International Search Report and Written Opinion dated Jun. 17, 2021, for International Application PCT/EP2021/055094.
(Continued)

*Primary Examiner* — Edwin C Gunberg
(74) *Attorney, Agent, or Firm* — The Dobrusin Law Firm, P.C.

(57) ABSTRACT

A scintillation cuvette for measuring ionizing radiation, the scintillation cuvette includes: a light guide structure with a light guide wall having a first refractive index; a window having a second refractive index, the first refractive index being lower than the second refractive index; and a scintillation medium situated in the scintillation cuvette, having a predefined refractive index that is higher than the first refractive index.

20 Claims, 7 Drawing Sheets

(56) References Cited

U.S. PATENT DOCUMENTS

| | | | |
|---|---|---|---|
| 4,833,326 A | | 5/1989 | Valenta et al. |
| 5,298,753 A | | 3/1994 | Sonne et al. |
| 5,357,114 A | | 10/1994 | Kaihola et al. |
| 5,483,070 A | * | 1/1996 | Valenta .................. G01T 1/204 |
| | | | 250/362 |
| 2009/0050812 A1 | | 2/2009 | Dunleavy et al. |

OTHER PUBLICATIONS

Konijn J et al. "Capillary detectors" Nuclear Instruments & Methods in Physics Research. Section A, Elsevier BV * North-Holland, NL, vol. 418, No. 1, Nov. 1, 1998 (Nov. 1, 1998), pp. 186-195.
International Preliminary Report on Patentability dated Feb. 17, 2022, for International Application PCT/EP2021/055094.
German Office Action dated Nov. 2, 2020, for German Application 102020202654.8.

* cited by examiner

SCINTILLATION CUVETTE FOR MEASURING IONISING RADIATION, MEASURING DEVICE FOR MEASURING IONISING RADIATION, METHOD FOR MEASURING IONISING RADIATION

CROSS-REFERENCE TO RELATED APPLICATIONS

This application is a US National Stage entry of PCT/EP2021/055094 filed on Mar. 2, 2021, which claims priority to DE 10 2020 202 654.8 filed on Mar. 2, 2020, all of which are hereby incorporated by reference herein for all purposes.

FIELD

The invention relates to a scintillation cuvette for measuring ionizing radiation, a measuring device for measuring ionizing radiation, and a method for measuring ionizing radiation.

BACKGROUND

Scintillation measurements for measuring ionizing radiation are well known from the prior art. There are two variants for the scintillation measurement: Either the sample to be measured is mixed with the scintillation medium or dissolved therein, or the scintillation medium is brought into the vicinity of the sample to be measured or immersed therein, or vice versa. In the first variant, a liquid scintillation medium is used in which the sample is present in dissolved or mixed form, forming a scintillation mixture (liquid scintillation counting (LSC)). The use of gels or solids specifically manufactured for the scintillation measurement is likewise possible. In the second variant, the radioactive sample to be measured is separate from the scintillation medium. While the mixture or solution of the sample and the scintillation medium according to the first variant may provide, for example, a quantitative determination of multiple radionuclides, including a differentiation of $\alpha$, $\beta$, and/or $\gamma$ radiation, the second variant is used, for example, for determining a general, spatially resolved radiation intensity, sometimes with a qualitative statement about the type of radiation.

For both variants, two different types of disturbance variables are of importance. These disturbance variables ensure that the signal of the radioactive decay or its energy is not imaged one-to-one at the detector.

The two types of disturbance variables are:
(a) The influence of external radiation that does not come from the sample. As a result, the detector erroneously measures too much signal.
(b) Losses during the transfer of the decay energy to the scintillation medium and/or subsequent losses in the intensity of the scintillation pulse, i.e., the scintillation light. As a result, the detector erroneously measures too little signal.

The disturbance variables result in an inaccurate count rate for the radioactive decays, and therefore the measured count rate is then not the true count rate of the radioactive decays; the disturbance variables also result in a falsified spectrum of the decay energies of the sample.

Losses as stated in (b) are also referred to as "quenching." A distinction is made among three types of quenching:
(b1) instrumental quenching caused by the geometry of the scintillation cuvette or of the measuring device,
(b2) chemical quenching caused by substances that impair the energy transfer during the scintillation process,
(b3) color quenching caused by substances that absorb the scintillation light.

SUMMARY

The object of the present invention is to avoid the disadvantages stated in conjunction with the prior art, and to provide a scintillation cuvette that effectively reduces at least instrumental quenching and allows a distinct increase in efficiency of the measurement of ionizing radiation.

The object of the present invention is achieved by a scintillation cuvette disclosed herein.

Accordingly, a scintillation cuvette for measuring ionizing radiation is provided, the scintillation cuvette including a light guide structure with a light guide wall having a first refractive index and a window having a second refractive index, the first refractive index being lower than the second refractive index. Within the meaning of the present invention, the light guide wall is a wall of the light guide structure. As a wall of the light guide structure, the light guide wall meets the requirement that the refractive index of the light guide wall (i.e., the first refractive index) is lower than the refractive index of the window of the scintillation cuvette (i.e., the second refractive index). The light guide wall of such a light guide structure may also be referred to as a light guide jacket. The scintillation cuvette according to the invention advantageously allows flashes of light that develop in the scintillation cuvette to be guided out of the scintillation cuvette very efficiently in a targeted manner and preferably supplied to one or more photomultipliers and/or another detector. As a result of the skilled arrangement of the different refractive indices, it is possible to guide scintillation light via total reflection at the light guide wall to the window and allow it to pass through the window and exit from the cuvette. The outer wall of the cuvette may also be referred to as a cuvette wall. The window is preferably formed by a section of the outer wall of the cuvette, and may also be referred to as a light exit window. It may be provided, for example, that the light exit window is formed by an end-face surface or base surface of the cuvette, for example a flat end-face surface or a flat base surface.

Within the meaning of the present invention, a scintillation cuvette is a container for keeping a sample during a scintillation measurement of the sample. The light guide wall preferably has the shape of a shell surface of a cylinder, particularly preferably a circular cylinder.

It is conceivable for the light guide wall to be situated along an outer wall of the scintillation cuvette. It is conceivable for the light guide wall to be formed by the outer wall of the scintillation cuvette. It may be provided, for example, that the light guide wall is formed by the shell surface of the cuvette wall. According to one embodiment, it is provided that the light guide wall is formed by the shell surface of the cuvette wall, and the light exit window is formed by an end-face surface or base surface of the cuvette. Accordingly, both the light guide wall and the light exit window may be formed by sections of the cuvette wall, the cuvette wall having two different refractive indices (due to appropriate material composition, for example). It is also conceivable for a portion of the light guide wall to be formed by the outer wall of the scintillation cuvette, and for another portion of the light guide wall to not be formed by the outer wall of the scintillation cuvette, but instead being situated inside the scintillation cuvette, for example.

It is also conceivable for the light guide wall to be situated (partially or completely) inside the scintillation cuvette. According to this embodiment, the cuvette wall may be designed having a single refractive index, and it is not necessary for the cuvette wall to have two different refractive indices.

The scintillation cuvette is preferably provided for use with a scintillation medium, the light guide wall having a lower refractive index than the scintillation medium. Within the meaning of the present invention, a scintillation medium is a medium that emits scintillation light by interaction with an ionizing radiation, for example α, β, or γ radiation. A scintillation medium may, for example, be a medium that contains molecules or other constituents which due to interaction with an ionizing radiation, for example α, β, or γ radiation, go into an excited state, and from the excited state go into a low-energy or unexcited state with emission of scintillation light. Alternatively or additionally, it may be provided that the light exit window has a higher refractive index than the scintillation medium. According to one embodiment, the scintillation cuvette thus contains a scintillation medium (i.e., the scintillation medium is situated in the scintillation cuvette), the light guide wall having a lower refractive index than the scintillation medium and/or the light exit window having a higher refractive index than the scintillation medium. The window is preferably situated at an end-face surface of the cuvette wall or is formed by an end-face surface of the cuvette wall.

Advantageous embodiments and refinements of the invention are set forth herein, with reference to the drawings.

The features, advantages, and embodiments disclosed below relate to all subject matter according to the invention.

The light guide wall is preferably made of PE and/or FEP and/or a composite of PE and FEP.

According to one preferred embodiment of the present invention, it is provided that the light guide wall is suitable for the total reflection of scintillation light in the direction of the window, the light guide wall being provided as a jacket of a light guide. This allows light from the scintillation medium to be guided, via total reflection in the light guide, from the scintillation cuvette in a targeted manner with a very high efficiency and to be supplied to a photomultiplier or another detector, for example. In addition, the opening angle at which the scintillation light exits from the scintillation cuvette is defined by the acceptance angle of the light guide, and is greatly reduced compared to scintillation cuvettes from the prior art.

According to one preferred embodiment of the present invention, it is provided that the scintillation cuvette is permeable to the scintillation light, at least in the region of the window, the scintillation cuvette preferably being a scintillation flask. Accordingly, the scintillation cuvette is provided for use with a scintillation medium or contains a scintillation medium from which scintillation light is emitted upon interaction with ionizing radiation, the window being permeable to the scintillation light. The window may in particular be designed in such a way that the intensity of the scintillation light upon passing through the window decreases by at most 50%, for example by at most 25%, preferably by at most 10%. Within the meaning of the present invention, a scintillation flask is also known as a vial.

According to one preferred embodiment of the present invention, it is provided that the light guide wall is formed by a circumferential shell surface of the scintillation cuvette. For this purpose, it is conceivable for the light guide wall to be formed by the cuvette wall.

This advantageously reduces the number of necessary components, thus simplifying the design of the scintillation cuvette.

According to one preferred embodiment of the present invention, it is provided that the light guide wall is situated at least partially inside the scintillation cuvette. It is thus advantageously possible to divide the interior of the scintillation cuvette by at least a portion of the light guide wall and/or to space the light guide wall apart from the cuvette wall.

According to one preferred embodiment of the present invention, it is provided that the window is formed by an end-face surface of the scintillation cuvette. In this way the geometry of the scintillation cuvette is skillfully utilized for the light guiding, in that the scintillation light is guided along a long side of the scintillation cuvette to the end-face surface.

According to one preferred embodiment of the present invention, it is provided that the scintillation cuvette contains a scintillation medium, situated in the scintillation cuvette, having a predefined refractive index that is higher than the first refractive index and lower than the second refractive index. This advantageously allows the light guiding through the light guide as a liquid light guide, with total reflection at the light guide wall and exiting through the window.

According to one preferred embodiment of the present invention, it is provided that the scintillation cuvette includes at least one further light guide with a light guide wall and/or a further light guide wall, the further light guide wall having a lower refractive index than the window and/or a further window, the light guide wall and/or the further light guide wall being provided as a jacket of the further light guide, the at least one further light guide being situated in parallel to the light guide. According to one embodiment, the scintillation cuvette is provided for use with a scintillation medium or contains a scintillation medium (i.e., the scintillation medium is situated in the scintillation cuvette), the further light guide wall having a lower refractive index than the scintillation medium, and/or the further window having a higher refractive index than the scintillation medium. The volume from which light is guided is preferably subdivided into the light guide and the at least one further light guide. It is conceivable for the scintillation cuvette to include a bundle of light guides. It is conceivable for the light guides in each case to include a tubular jacket. It is conceivable for a cross-sectional area of an individual light guide of the bundle of light guides to be less than 4 mm$^2$. In this way, capillary forces may be utilized to make it easier to receive the sample and/or the scintillation medium and/or the scintillation mixture, for example for on-site sampling. The cores of the light guides of the bundle of light guides are formed by the sample and/or the scintillation medium and/or the scintillation mixture. To minimize air bubbles, the scintillation cuvette may be turned upside down several times during filling or placed upside down during the measurement. Within the meaning of the present invention, "upside down" means that a filling opening of the scintillation cuvette is oriented away from the ground.

According to one preferred embodiment of the present invention, it is provided that a scintillation medium is situated at least partially inside the light guide wall and/or the further light guide wall, a liquid light guide or a further liquid light guide being formed by the scintillation medium and the light guide wall and/or the further light guide wall. A core of the light guide and/or of the further light guide preferably contains the scintillation medium. The core of the liquid light guide and/or of the further liquid light guide is particularly preferably formed by the scintillation medium or the scintillation mixture. The scintillation medium is preferably liquid or gel-like. This allows light from the scintillation medium to be guided, via total reflection in the liquid light guide, from the scintillation cuvette in a targeted manner with a very high efficiency and to be supplied to a photomultiplier or another detector, for example. In addition, the opening angle at which the scintillation light exits from the scintillation cuvette is defined by the acceptance angle of the liquid light guide, and is greatly reduced compared to scintillation cuvettes from the prior art. For measuring ionizing radiation of a sample, the sample is preferably mixed with the scintillation medium or dissolved therein, preferably forming a liquid scintillation mixture. If radioactive decay occurs in the sample, a particle emitted during the decay (an $\alpha$, $\beta$, or $\gamma$ particle, for example) may excite molecules of the scintillation medium to emit light by interaction, for example via collision processes. The emitted light is guided from the scintillation cuvette in a targeted manner with the aid of the liquid light guide, and may be subsequently detected.

It may be provided that the sample to be examined is situated inside and/or outside the liquid light guide. It is preferably provided that both the sample and the scintillation medium are situated inside the liquid light guide. It may be provided, for example, that the scintillation medium is liquid, the sample or the sample material is mixed with the scintillation medium or dissolved therein, forming a liquid scintillation mixture, and the liquid scintillation mixture is situated inside the light guide structure, forming a liquid light guide.

As an example, which, however, is non-limiting, it is provided that the scintillation cuvette and/or the cuvette wall are/is made of polyethylene (PE) and/or fluorinated ethylene propylene (FEP) and/or a composite of PE and FEP. It is also conceivable for the scintillation cuvette to include a shell and/or a jacket made of polyethylene (PE) and/or fluorinated ethylene propylene (FEP) and/or a composite of PE and FEP. In the case that a light guide wall and also a light exit window are formed by the cuvette wall, the cuvette in the region of the light guide wall may be made of some other material than in the region of the light exit window.

It is preferably provided that the scintillation cuvette, at least at its end-face surfaces, is permeable to the scintillation light. Accordingly, it may be provided that the light exit window is formed by an end-face surface of the cuvette. Elongated geometries are preferably provided for the scintillation cuvette. It is conceivable for the scintillation cuvette to be cylindrical. In particular, it is conceivable for the scintillation cuvette to have the shape of a circular cylinder or of an elliptical cylinder. However, it is also conceivable for the scintillation cuvette to be tube-shaped. It is also conceivable for the scintillation cuvette to have a cuboidal, cubic, or prismatic shape. It is preferably provided that the scintillation cuvette has a volume in the range of 1 mL to 100 mL. In a further exemplary embodiment, microvolumes (for example, in the form of liquid light guiding pipette tips) or very large volumes (for example, in the form of liquid light guiding pipelines) are also provided. In a further preferred embodiment, it is provided that the scintillation cuvette is made, at least in part, from one or more gas-permeable plastics. This allows the scintillation cuvette to simultaneously function as a sample collector for gaseous radioactive substances, for example radon.

According to a preferred further embodiment of the present invention, it is provided that the scintillation cuvette has a main direction of extension, the light guide being situated in parallel to the main direction of extension. This advantageously allows the light guide to align along a long extension of the scintillation cuvette, thus ensuring an optimal geometry for the light guiding. For a cylindrical scintillation cuvette, it is conceivable for the main direction of extension to be the height direction of the cylinder, i.e., a connecting line between the centers of the base surfaces of the cylinder, situated perpendicular to the base surfaces. The light guide is preferably situated along the height of the scintillation cuvette, so that scintillation light may exit from the light guide at the base or at the end-face surface of the scintillation cuvette.

According to a further embodiment of the invention, it is provided that additional reflective elements are situated around the light guide(s). The reflective elements are preferably suitable for reflecting the scintillation light. The reflective elements preferably include a reflector or form a reflector. The reflector is a reflector for reflecting the scintillation light. The additional reflector is situated either so that light that is not reflected from the light guide is reflected back into the sample by a reflector, or the light is guided as directly as possible onto the detector. According to one embodiment of the invention, it is provided that the light guide wall and/or the further light guide wall and/or the cuvette wall include(s) a reflective surface at an outer surface for reflecting the scintillation light. The reflective surface preferably overlays the entire outer surface of the light guide wall or of the further light guide wall or of the cuvette wall, except for a section that functions as an exit opening or window for the scintillation light. The reflective surface is preferably designed in such a way that scintillation light is reflected back from it at the outer surface of the light guide wall or of the further light guide wall or of the cuvette wall into the interior of the light guide. The scintillation light is thus hindered from undesirably leaving the light guide or the cuvette.

A further subject matter of the present invention for achieving the above-stated object relates to a system for detecting ionizing radiation, including a scintillation cuvette according to the invention, a scintillation medium that is situated in the scintillation cuvette, and a detector, characterized in that the detector is arranged for detecting scintillation light that exits from the window. For example, it may be provided that the light exit window is formed by an end-face surface of the scintillation cuvette, and the detector is situated in front of the end-face surface that functions as a light exit window, so that scintillation light that exits from the light exit window is detectable by the detector.

The light guide is preferably arranged for guiding light from the scintillation medium toward the detector. With the system according to the invention, it is possible to reduce quenching by greatly increasing the portion of the scintillation light that is generated in the scintillation cuvette and strikes the detector. Smaller detector surfaces and more compact designs are possible due to the smaller opening angle of the scintillation light that exits from the scintillation cuvette. Light detectors via which the scintillation light, generated by means of the scintillation medium, is detectable are preferably provided as detectors. These types of light detectors may be designed as a photodetector, photodiode, photomultiplier, phototransistor, or photoresistor, for example. The light detector is preferably designed in such a way that scintillation light that strikes it is converted into an electrical detector signal, for example, by means of which the scintillation light is detectable, and is also referred to as a scintillation light detector. (Si)PMT detectors and/or CCD detectors are preferably provided as detectors.

The compact shape may also make it possible for the scintillation cuvette to be coupled to existing systems, such as fluorescence spectroscopic systems, including a PMT detector or CCD detector.

For example, to minimize the influence of external radiation that does not come from the sample, it is preferably provided to use a coincidence circuit or anticoincidence circuit including a plurality of detectors. For this purpose, it is preferably provided that at least one detector and a further detector of the measuring device are connected to one another in a coincidence circuit or anticoincidence circuit. The measuring device preferably includes one or more external reference nuclides.

According to a preferred further embodiment of the present invention, it is provided that the scintillation cuvette is situated in a sample holder, the sample holder having an opening at its first side facing the detector, the sample holder preferably including a reflector, at least at its second side opposite from the first side, for reflecting light in the direction of the detector. For example, it may be provided that the sample holder has the opening at its first side facing the detector, the sample holder preferably having a reflector, at least at its second side opposite from the first side, for reflecting scintillation light that exits from the light guide back into the liquid light guide and/or in the direction of the detector. In this way, scintillation light that originally does not extend in the direction of the detector is reflected at the reflector and guided to the detector, preferably by the liquid light guide, and detected.

According to a preferred further embodiment of the present invention, it is provided that the detector includes a silicon photomultiplier. Silicon photomultipliers (SiPMs) are superior to conventional photomultipliers in many respects. Due to the relatively small detection surface of the silicon photomultipliers, their use in measuring ionizing radiation has been uncommon thus far. Only the combination with the measuring device according to the invention allows meaningful use of the silicon photomultipliers.

It is conceivable for the detector to have a detection surface that is a maximum of three times as large as the surface of the window, the detection surface preferably having a maximum size equal to that of the surface of the window.

According to a preferred further embodiment of the present invention, it is provided that the system includes a further detector, the scintillation cuvette being situated between the detector and the further detector. This advantageously allows a coincidence measurement, and thus provides the option of checking measuring results and adapting measured values. It is preferably provided that the further detector includes a silicon photomultiplier. For this purpose, it is preferably also provided that the sample holder has a further opening for the scintillation light to pass through, the further detector being situated in front of the further opening in such a way that scintillation light passing through the further opening is detectable by the further detector. It is conceivable for the detector and the further detector to be detectors with similar or identical designs.

According to one preferred embodiment of the present invention, it is provided that the system includes two detectors, the scintillation cuvette being situated between both detectors. This allows a coincidence measurement. Preferably only the events which within a coincidence time involve the detector and the further detector are recorded. In addition to increasing the instrumental efficiency by use of the scintillation cuvette, the remaining quenched scintillation pulses may thus be discarded, as the result of which a less quenched decay spectrum is obtained.

According to a preferred further embodiment of the present invention, it is provided that the system includes a reference nuclide for calibrating measured values. This allows a calibration of the measurement to be made based on the reference nuclide. It is conceivable for the count rate and/or the measured energies to be corrected based on the calibration.

According to a preferred further embodiment of the present invention, it is provided that the system includes a shield, preferably a lead shield. This allows the greatest possible shielding from external ionizing radiation, and thus allows a falsification of the measuring results to be reduced. It is preferably provided that the shield is designed in such a way that the scintillation cuvette and/or the sample holder and/or the detector and/or the further detector are/is situated within the shield or enclosed by the shield. The shield is preferably provided in the form of an outer casing. The shield is a shield for shielding from ionizing radiation that enters the scintillation cuvette from the outside.

It is preferably provided that the system includes a monitoring detector for measuring external ionizing radiation. Within the meaning of the present invention, a monitoring detector is a so-called guard detector, for example, that measures ionizing radiation penetrating into the system from the outside. It is thus advantageously possible to correct the falsification of the measuring results caused by the external ionizing radiation. It is preferably provided to use a coincidence circuit/anticoincidence circuit including a plurality of detectors. For this purpose, it is preferably provided that at least one detector for the sample and the scintillation medium and at least one further detector only for the scintillation medium, of the system are connected to one another in an anticoincidence circuit. The system preferably additionally includes one or more external reference nuclides.

A further subject matter of the present invention for achieving the object stated at the outset relates to a method for measuring ionizing radiation, a radioactive sample being mixed with a scintillation medium or dissolved in the scintillation medium, scintillation light from the scintillation medium being guided toward a detector with the aid of a liquid light guide. For this purpose, it is preferably provided that a scintillation cuvette according to the invention and/or a system according to the invention are/is used. The scintillation medium and/or the scintillation mixture are/is preferably liquid.

The radioactive sample is preferably chemically worked up beforehand and/or mixed directly with the scintillation medium. The mixture of the sample and the scintillation medium is preferably subsequently present with a liquid or gel-like consistency. For the wavelengths of the scintillation light, the scintillation medium preferably has an attenuation length that is greater than 0.5 m, preferably greater than 1 m, and/or a water absorption capacity that is preferably at least 10 percent by weight, preferably at least 50 percent by weight. The attenuation length is the distance after which the initial intensity of a light beam has died down to approximately 37%. The water absorption capacity refers to the quantity of water that can be mixed into a substance or medium without phase formation. The absorption of the mixed sample preferably takes place via simple infusion, penetration via injection or capillary forces, or via diaphragm pumps, centrifugal pumps, or peristaltic pumps. Coincidence circuits including two detectors or circuits including a detector and an external reflector are preferably used for the measurement. For correction of the quenching, an external radionuclide or the SIS method is preferably used at the same time. In measuring areas with high external ionizing radiation, lead shields or monitoring detectors are preferably also used. Since the minimization of the quenching is accompanied by a broadening of the spectra toward higher channels, a mathematical separation of various nuclides in the sample, for example by means of end point determination, may be applied more advantageously than in the prior art.

The efficiency of the scintillation measurement is preferably determined using one or more external reference nuclides, and a direct correction of the losses is carried out on the device side. The scintillation measurement is preferably corrected by adding a standard nuclide to the sample or by use of quench curves. As a variant for the quench correction, determining the spectral center (SIS) and subsequently deducing the efficiency of the SC measurement with the aid of tables is preferably provided. During the scintillation measurement, it is conceivable to use higher limitations regarding the pulses counted by the detector (so-called triple coincidence counting) for the quench correction. The efficiency of the scintillation measurement is preferably determined via the ratio of the events counted by three detectors to the events counted by two detectors (triple-to-double coincidence ratio).

TABLE 1

Preferably provided methods for quench correction

| Method | Brief description | Advantages |
|---|---|---|
| SIS | Spectral index of the sample (center of the spectrum); evaluation method | Quick, convenient, requires no further equipment, good applicability |
| tSIE | Transformed spectral index of the external standard, measurement of the externally excited Compton spectrum of the sample and comparison to the unquenched Compton spectrum; measuring method | Very precise, also for highly quenched samples and low count rates |
| TDCR | Triple-to-double coincidence ratio, comparison of the count rate for all three detectors and the count rate for two of three detectors; measuring method | The spectrum already has lower quenching without correction, since low-intensity scintillation pulses are discarded; the TDCR value is additionally used for the correction |
| Internal standard | Addition of a known radionuclide to the sample and determination of the efficiency; direct measuring method | Usable for all LSC devices |

All of the methods stated in Table 1 are methods for determining the efficiency of a scintillation measurement. The efficiency is preferably subsequently used for correcting the data.

All of the above statements under "Disclosure of the Invention" also apply to the scintillation cuvette according to the invention, the system according to the invention, and the method according to the invention.

Further particulars, features, and advantages of the invention result from the drawings, and from the following description of preferred embodiments with reference to the drawings. The drawings merely illustrate exemplary embodiments of the invention, and do not limit the essential concepts according to the invention.

DETAILED DESCRIPTION

Figure 1:
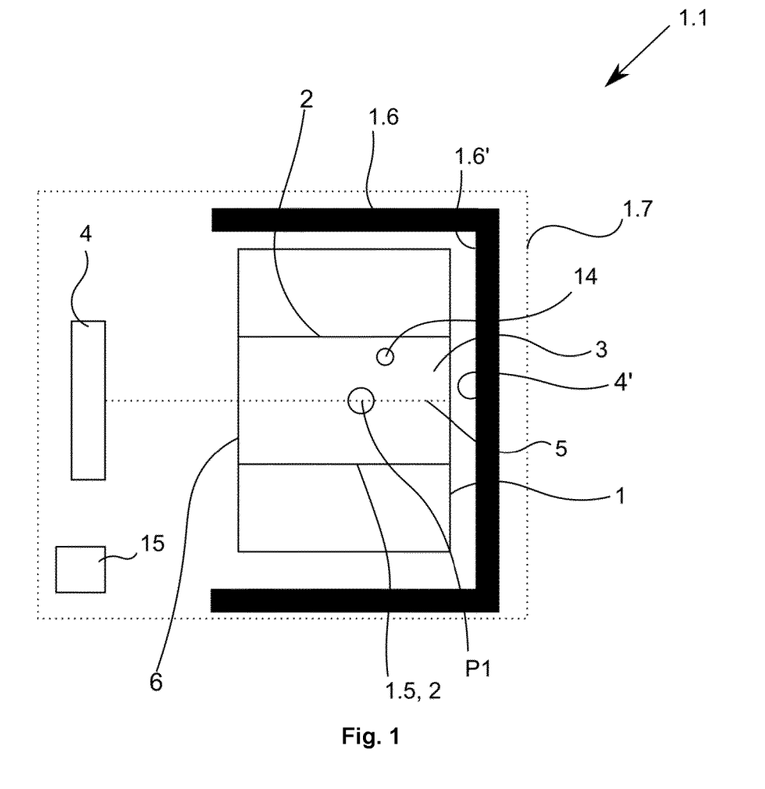
FIG. 1 shows a schematic view of a system according to one exemplary embodiment of the present invention, including a scintillation cuvette according to one exemplary embodiment of the present invention.

FIG. 1 shows a schematic view of a system 1.1 according to one exemplary embodiment of the present invention, including a scintillation cuvette 1 according to one exemplary embodiment of the present invention. A liquid scintillation medium 3 is situated here in the scintillation cuvette 1, which in the present case is a scintillation vial that is permeable to scintillation light. A radioactive sample is dissolved in the scintillation medium 3, forming a liquid scintillation mixture.

The scintillation cuvette 1 also includes a liquid light guide 1.5 that is formed by a light guide wall in the form of a jacket 2 and the scintillation medium 3 that is enclosed by the jacket 2, and that contains the dissolved radioactive sample. During an individual radioactive decay, the sample emits a particle or a radiation quantum that interacts with the molecules of the scintillation medium 3 and excites them to emit scintillation light. For measuring the radioactive decay, the emitted scintillation light is recorded by a corresponding detector 4. In the illustrated preferred embodiment, the detector 4 includes a silicon photomultiplier. The refractive index of the scintillation medium 3 and of the scintillation mixture is higher than that of the light guide wall, which enables total reflection of scintillation light in the liquid light guide 1.5 toward a window 6. The window is formed by a section of the outer wall of the scintillation cuvette 1, i.e., the cuvette wall. The window 6 has a higher refractive index than the light guide wall 2, so that the scintillation light may exit through the window 6 with a lower reflection component. For example, it may be provided that the refractive index of the window 6 is higher than the refractive index of the scintillation medium 3 and of the scintillation mixture, so that the scintillation light may exit through the window 6 without total reflection. In the present case, it may be provided that the entire outer wall of the scintillation cuvette 1 has a higher refractive index than the light guide wall 2.

The emitted scintillation light (not illustrated here; see FIG. 5, for example), which, starting from a scintillating point source P1, strikes the detector 4, may reach the detector 4 directly without reflection, for example. If the scintillation light that is emitted by the scintillating point source P1 is radiated at a fairly large angle relative to the optical axis 5, it is still desirable for this scintillation light to not simply leave the scintillation cuvette 1 without being recorded by the detector 4. To reduce this instrumental quenching, the scintillation cuvette 1 includes the liquid light guide 1.5, which is able to guide scintillation light from the scintillation medium 3 toward the detector 4 via total reflection. The liquid light guide 1.5 here includes a jacket 2 made of FEP that is formed by the light guide wall 2. However, it is also possible for the liquid light guide to include a jacket 2 made of PE or a mixture of PE and FEP or some other material that has a lower refractive index than the scintillation medium 3. The other material may be, for example, Teflon, variants thereof, or further inorganic materials having a low refractive index such as $SiO_2$ nanorods, for example. The scintillation cuvette 1 is situated in a sample holder 1.6. At a first side the sample holder 1.6 is open toward the detector 4, so that scintillation light from the scintillation cuvette 1 may strike the detector 4. On the second side 1.6' of the sample holder 1.6 opposite from the first side, the sample holder includes a reflector 4' that reflects light, exiting the scintillation cuvette 1 away from the detector 4, back into the scintillation cuvette, and in particular also couples the light into the liquid light guide 1.5. The shape and size of the reflector 4' preferably correspond to the shape and size of the end-face surface of the scintillation cuvette 1.

The liquid light guide 1.5, due to its defined acceptance angle, also allows a reduction of the beam angle of the scintillation light. It is thus possible to use detectors 4 having fairly small detection surfaces, which allows an overall very compact design of the system 1.1.

A shield 1.7, preferably a lead shield, ensures effective protection of the scintillation medium 3 from external ionizing radiation, which would falsify measuring results. The system 1.1 includes a monitoring detector 15 that measures external ionizing radiation entering the measuring device 1.1, and thus allows deviations in the measured values caused by the external ionizing radiation to be corrected. The measuring device 1.1 also includes a reference nuclide 14 for correcting the measured values. The intensity and the energy spectrum of the reference nuclide 14 are known, so that the determined measured values may be calibrated to them.

Figure 2:
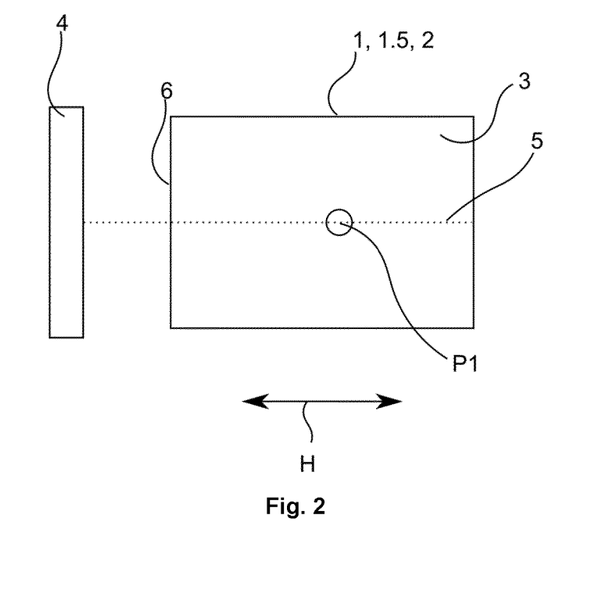
FIG. 2 shows a schematic view of a system according to one exemplary embodiment of the present invention, including a scintillation cuvette according to one exemplary embodiment of the present invention.

FIG. 2 shows a schematic view of a detail of a system 1.1 according to one exemplary embodiment of the present invention, including a scintillation cuvette 1 according to one exemplary embodiment of the present invention. To improve clarity, only the scintillation cuvette 1, the liquid light guide 1.5 with the scintillation medium 3, and the jacket 2, the detector 4, and the scintillating point source P1 are illustrated here. Unlike the embodiment illustrated in FIG. 1, the liquid light guide 1.5 extends along the side walls of the scintillation cuvette 1 in parallel to the main direction of extension H of the scintillation cuvette 1. It is preferably provided that the side walls of the scintillation cuvette 1 form the jacket 2 of the liquid light guide 1.5, i.e., the light guide wall (i.e., the lateral outer walls or the shell surface of the scintillation cuvette 1 form(s) the light guide jacket 2). The liquid light guide 1.5 encompasses the entire interior of the scintillation cuvette 1 here. The light emitted by the scintillating point source P1 exits through the end-face surface of the scintillation cuvette 1 in the direction of the detector 4, a window 6 for the scintillation light to pass through being formed by this end-face surface. According to this embodiment, the end-face surface of the scintillation cuvette 1, which functions as a window 6, thus has a higher refractive index than the side walls of the scintillation cuvette 1, which function as a light guide jacket 2. It may be provided in particular that the refractive index of the end-face surface of the scintillation cuvette 1, which functions as a window 6, is higher than the refractive index of the scintillation mixture or scintillation medium 3, and that the refractive index of the side walls of the scintillation cuvette 1, which function as a light guide jacket 2, is lower than the refractive index of the scintillation mixture or scintillation medium 3. The sample holder is not illustrated; however, the same as in the exemplary embodiment from FIG. 1, it includes a reflector that reflects light, exiting at the side opposite from the end-face surface of the scintillation cuvette 1 that functions as a window 6, back into the liquid light guide 1.5.

Figure 3:
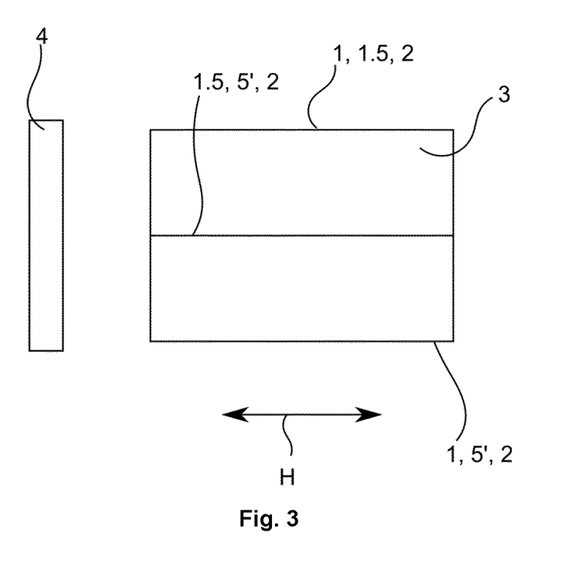
FIG. 3 shows a schematic view of a system according to one exemplary embodiment of the present invention, including a scintillation cuvette according to one exemplary embodiment of the present invention.

FIG. 3 shows a schematic view of a detail of a system 1.1 according to one exemplary embodiment of the present invention, including a scintillation cuvette 1 according to one exemplary embodiment of the present invention. FIG. 3 shows the embodiment illustrated in FIG. 2, with the difference that the embodiment illustrated here includes a further liquid light guide 5' in addition to the liquid light guide 1.5. The further liquid light guide 5' is situated in parallel to the liquid light guide 1.5. The outer walls of the scintillation cuvette 1 together with a plastic layer situated in the scintillation cuvette 1 form the liquid light guide jackets 2, i.e., the light guide walls, of the liquid light guides 1.5, 5'.

Figure 4:
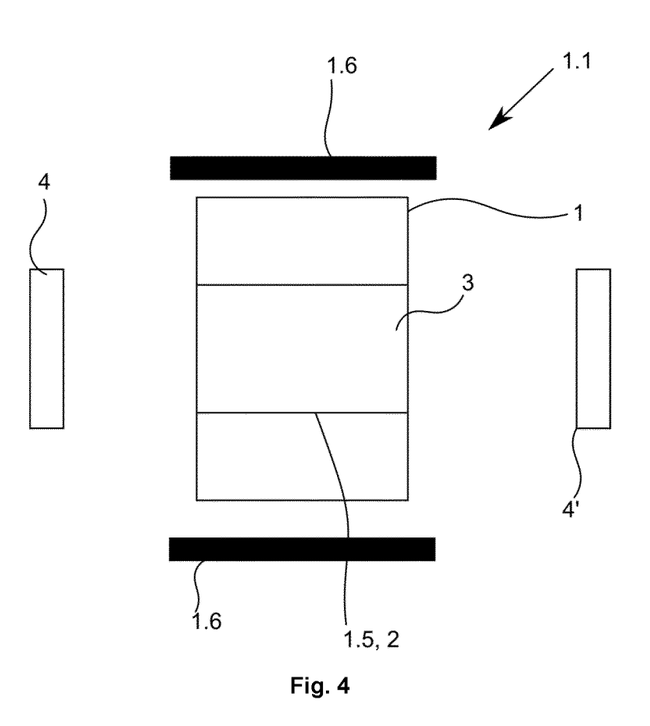
FIG. 4 shows a schematic view of a system according to one exemplary embodiment of the present invention, including a scintillation cuvette according to one exemplary embodiment of the present invention.

FIG. 4 shows a schematic view of a system 1.1 according to one exemplary embodiment of the present invention, including a scintillation cuvette 1 according to one exemplary embodiment of the present invention. The embodiment shown in FIG. 1 is illustrated, with the difference that the measuring device 1.1 includes a sample holder that is open at two sides, and a further detector 4'. The further detector 4' together with the detector 4 allows a coincidence measurement via which the measured values of the measuring device 1.1 may be corrected if necessary. The shield, the monitoring detector, and the reference nuclide are not illustrated here.

Figure 5:
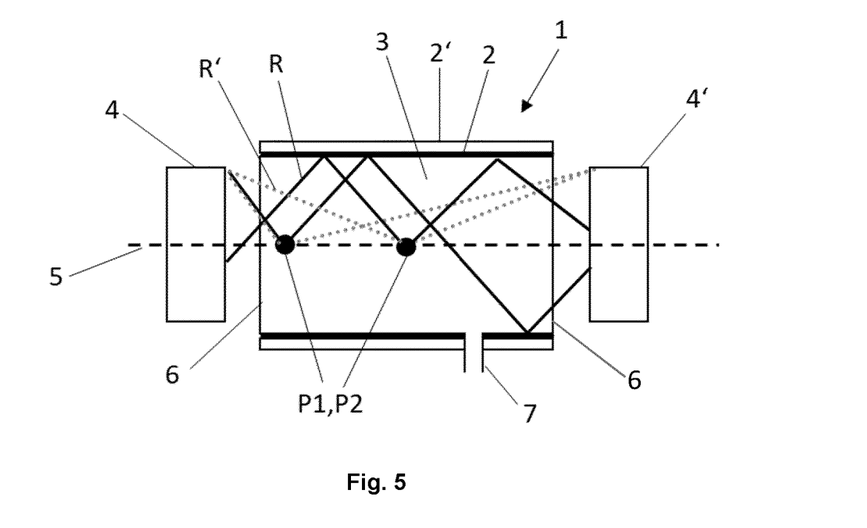
FIG. 5 shows a schematic view of a system according to one exemplary embodiment of the present invention, including a scintillation cuvette according to one exemplary embodiment of the present invention.

FIG. 5 shows a schematic view of the use of the scintillation cuvette 1 according to one exemplary embodiment of the present invention. The scintillation cuvette 1 extends in the longitudinal direction, and includes a light guide wall that is used as a jacket 2, and that together with the scintillation medium 3 forms a liquid light guide. Further reflective material may optionally be situated outside the scintillation cuvette 1 as an additional reflector 2'. The scintillation light generated by scintillation exits the scintillation cuvette 1 via the window 6 and propagates here in the direction of the detector 4. Within the meaning of the present invention, a window 6 is a region of the scintillation cuvette 1 having an optical density that is greater than the optical density of the light guide jacket 2, preferably greater than the optical density of the scintillation mixture and/or scintillation medium 3. The window 6 is thus a region in which reduced or no total reflection of the scintillation light occurs, and instead, an increased transmission of the scintillation light through the window 6 results. A window 6 may preferably be a recess in the jacket 2 which is necessary for the liquid light guide, so that no total reflection takes place. It is also conceivable to use transparent materials such as glass.

The scintillation light that exits via the end-face surface of the scintillation cuvette 1 opposite from the window 6 may either be detected via a further detector 4', or may be reflected onto the detector 4 via a reflector 4' and/or coupled into the liquid light guide 1.5. The sample is filled in via an opening 7 in the scintillation cuvette 1. To minimize optical losses that occur at the opening 7, for a scintillation measurement the opening 7 is preferably closed liquid-tight using a precisely fitting stopper made of FEP or polytetrafluoroethylene (PTFE), for example.

The beam path R schematically shows the beam angles of the scintillating point sources P1 and P2, detected by the detector 4, when the jacket 2 of the scintillation cuvette 1 together with the scintillation medium 3 forms a liquid light guide, while the beam path R' shows the beam angle detected by the detector 4 without total reflection at the scintillator-jacket interface.

Although the scintillating point source P2 in the example shown here is spaced only 1 cm apart from the scintillating point source P1, the portion of scintillation light that reaches the detector 4 on a direct path from the point source P2 is much smaller than for the scintillating point source P1. Expressed in solid angles, approximately 120° (out of 720°) from the scintillating point source P1 reach detector 4 on a direct path, and for P2 this angular value is approximately 20°. Thus, if one compares the system 1.1 according to the exemplary embodiment of the present invention illustrated here, the solid angle at which emitted scintillation light reaches the detector 4 is at least as great as the acceptance angle of the liquid light guide. For a scintillation medium 3 having a refractive index of n=1.6 and FEP (having a refractive index of n=1.34) as the jacket 2, this means that now, instead of 20°, due to the total reflection in the liquid light guide approximately 30° of the full solid angle from the scintillating point source P2 reach the detector 4. The detected portion of the scintillating point source P1 and the scintillating point source P2, which propagates in the direction of the detector/reflector 4', without a liquid light guide is 10° for the scintillating point source P1, and is 20° for the scintillating point source P2, whereas when a liquid light guide is used, solid angles of approximately 30° are detected here for both the scintillating point source P1 and the scintillating point source P2.

It is also mentioned that upon exiting the window 6, the scintillation light is subjected to a deflection away from the detector 4 due to the scintillator-air transition, so that the detected solid angles are even smaller than stated above. Since according to one exemplary embodiment of the present invention, the window 6 of the scintillation cuvette 1 is much smaller than the exit surface, which conventionally is distributed over the entire sample volume, the effect of the beam deflection at the scintillator-air interface also has less influence, and may be compensated for or reduced by moving the detector 4 or the detectors 4, 4' closer to the scintillation cuvette 1.

Figure 6:
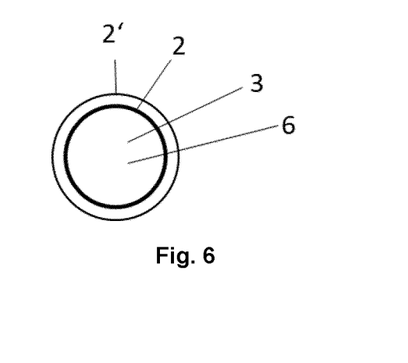
FIG. 6 schematically shows the end-face surface of the scintillation cuvette from FIG. 5.

FIG. 6 schematically shows the end-face surface of the scintillation cuvette from FIG. 5 together with the window 6. The jacket 2, the scintillation medium 3, and the additional reflector 2' are also apparent.

Figure 7:
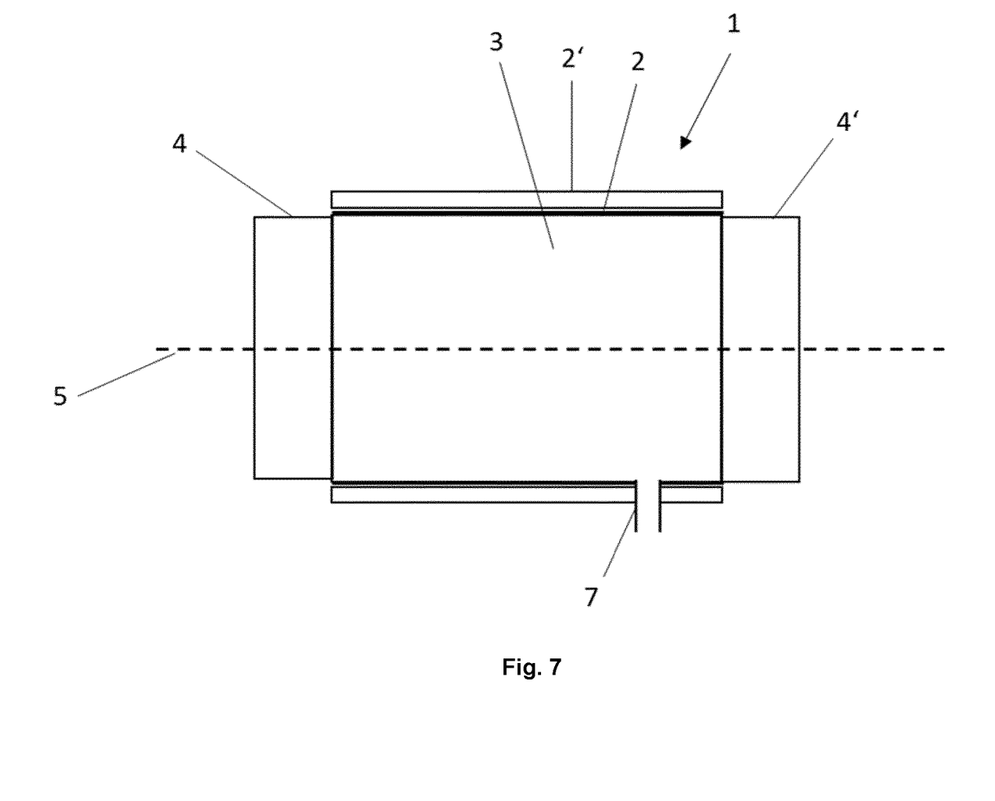
FIG. 7 shows a schematic view of a system according to one exemplary embodiment of the present invention, including a scintillation cuvette in direct contact with a detector and a further detector/reflector.

FIG. 7 shows a schematic view of a system 1.1 according to a further exemplary embodiment of the present invention. The detectors 4, 4' or the detector 4 and reflector 4' here are situated seamlessly at the scintillation cuvette 1. In this way, on the one hand the refraction losses discussed above, and on the other hand other reflection losses that are likewise caused in the scintillator-air interface, are prevented. According to this exemplary embodiment of the present invention, the detectors/reflectors 4, 4' and the scintillation cuvette 1 are preferably fixedly connected to one another. It is also conceivable for the detectors 4, 4' or the detector 4 and reflector 4' to not be situated seamlessly at the scintillation cuvette 1, but instead, for gaps between the detectors 4, 4' or the detector 4 and reflector 4' and the scintillation cuvette 1 to be filled with an immersion fluid, for example an immersion oil.

Figure 8:
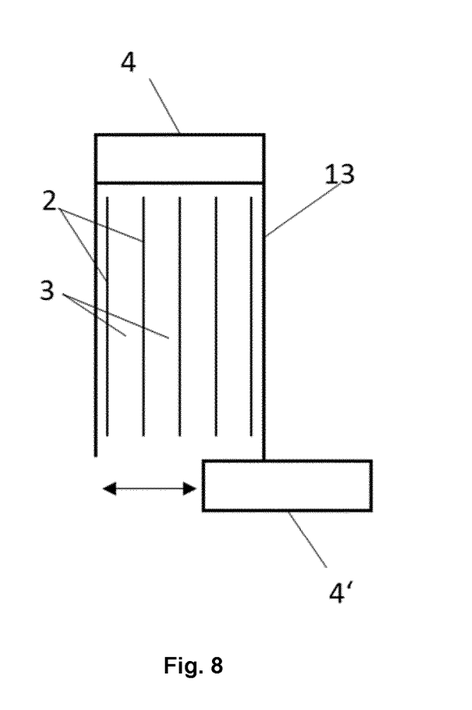
FIG. 8 shows a schematic view of a system according to one exemplary embodiment of the present invention, including multiple liquid light guides.

FIG. 8 shows a schematic view of a system 1.1 according to one exemplary embodiment of the present invention, in which the sample volume is distributed over multiple liquid light guides. Filling via capillary forces is thus possible. The detector 4 at the upper end is preferably stationary, while a movable second detector 4' or reflector 4' is optionally situated at the lower end. The scintillation medium 3 preferably fills the total volume of the scintillation cuvette 1, including the liquid light guide cavities, which thus likewise form a liquid light guide.

Figure 9:
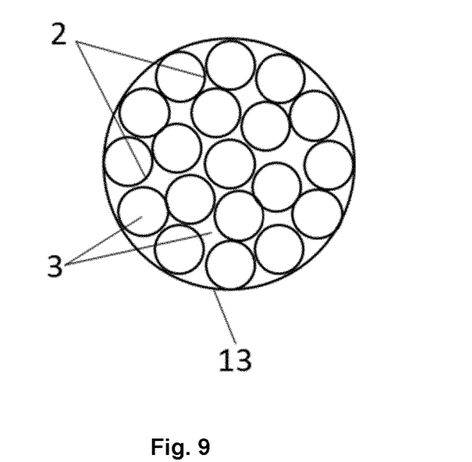
FIG. 9 shows a schematic view of the end-face surface from FIG. 8.

FIG. 9 schematically shows the end-face surface of the scintillation cuvette 1 from FIG. 8. The preferably cylindrical shape is favorable for most detectors, although polygonal variants are likewise conceivable.

Figure 10:
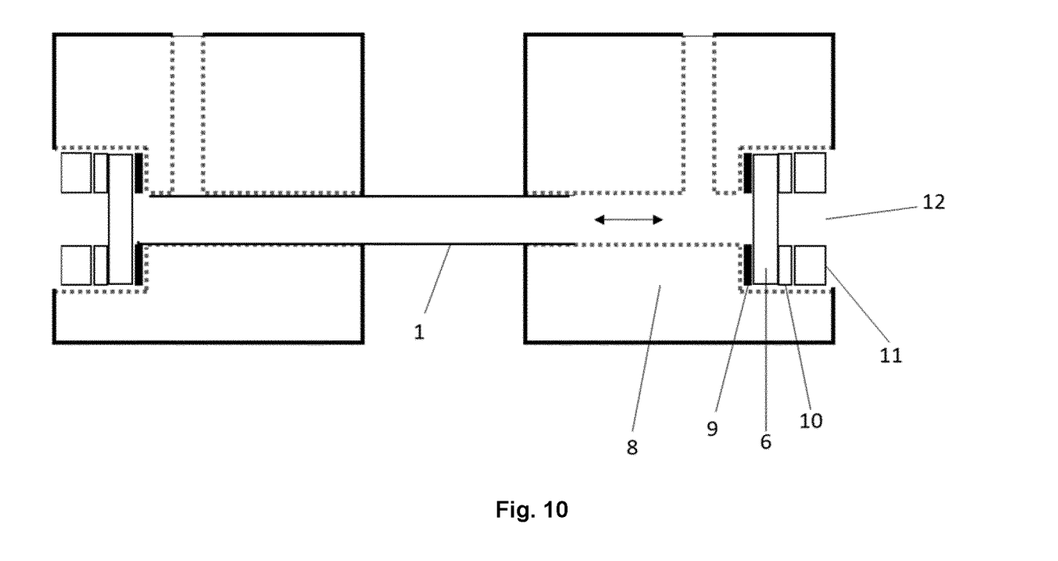
FIG. 10 shows a schematic layout of a modular system according to one exemplary embodiment of the present invention.

FIG. 10 schematically shows an example of a modular layout of a liquid scintillation measurement according to one exemplary embodiment of the present invention. The shown modular layout contains two distributors 8 into which the liquid light guide to be formed or the scintillation cuvette 1 may be inserted or screwed. On the one hand this allows easy disassembly of the system for cleaning purposes, for example, and on the other hand the scintillation cuvette 1 may be filled while approximately half-inserted (right side of FIG. 10), while the measurement takes place with full insertion (left side of FIG. 10).

The filling and emptying of the system 1.1 preferably also takes place via the distributors 8. The distributor 8 is preferably provided with a closure that forms the window of the scintillation cuvette 1. The closure may be a glass plate or the like. Situated on the other side of the window is a connection 11 for a detector or an optical coupling element, which may likewise be inserted or screwed in via the opening 12.

To prevent losses during the scintillator-air transition, the remaining gap between the detector and the window 6 may be filled with an immersion fluid. The window mounting 10, for example a screw connection for the window 6, and the mounting for the detector 11 may also be designed as a single component. In a further alternative design from FIG. 6, the closure may be dispensed with and the detector may be sealingly screwed or inserted into the optical distributor inlet with the aid of sealing elements, for example a sealing ring 9.

Figure 11:
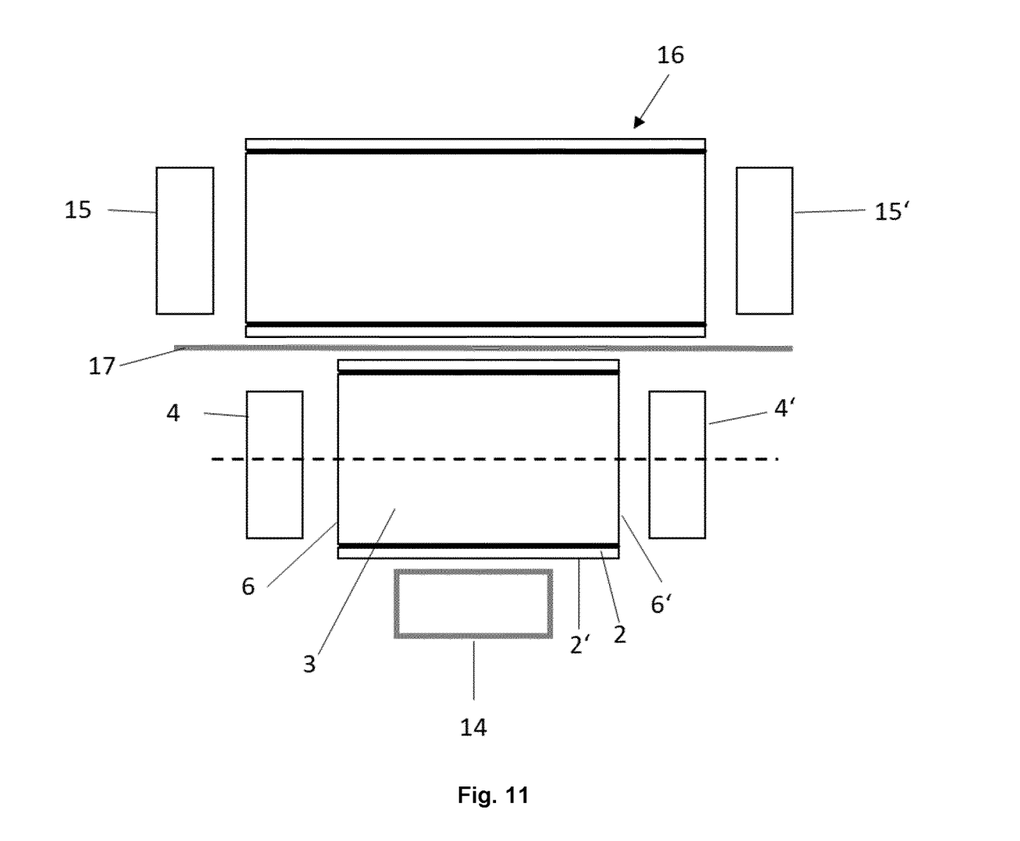
FIG. 11 shows an example of a schematic use of a system according to one exemplary embodiment of the present invention, together with an external reference nuclide and a monitoring detector system.

FIG. 11 shows an example of an application of the system 1.1 together with an external reference nuclide 14 and a monitoring cell 16 designed as a monitoring detector system. The application may also be carried out using only the reference nuclide 14 or only the monitoring cell 16. The monitoring cell 16 is preferably mounted above the scintillation cuvette 1, and is slightly longer than same in order to efficiently record cosmic radiation. The monitoring cell 16 includes a scintillation cuvette, preferably a scintillation cuvette according to an exemplary embodiment of the present invention. For recording external ionizing radiation, a first monitoring detector 15 and preferably a second monitoring detector 15' are situated at the scintillation cuvette of the monitoring cell 16.

Figure 12A:
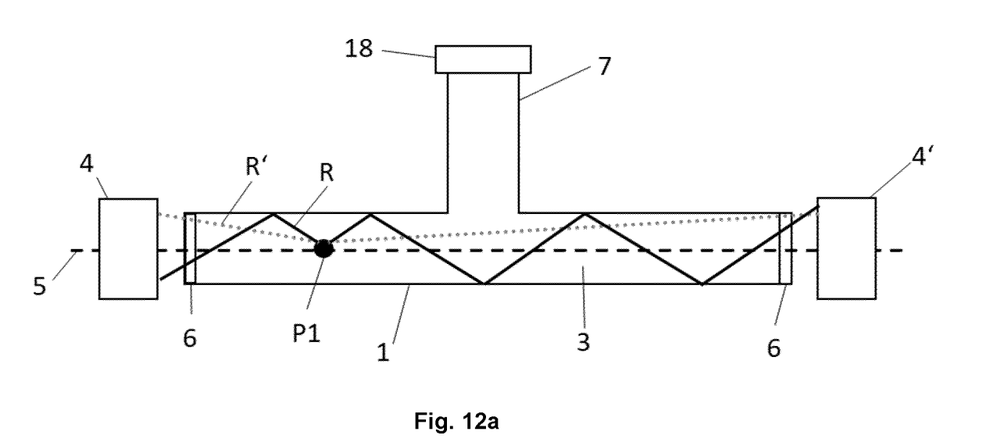
FIG. 12a shows an example of the use of a scintillation cuvette according to one exemplary embodiment of the present invention in a system according to one exemplary embodiment of the present invention, using the example of the determination of $^{14}C$.
Figure 12B:
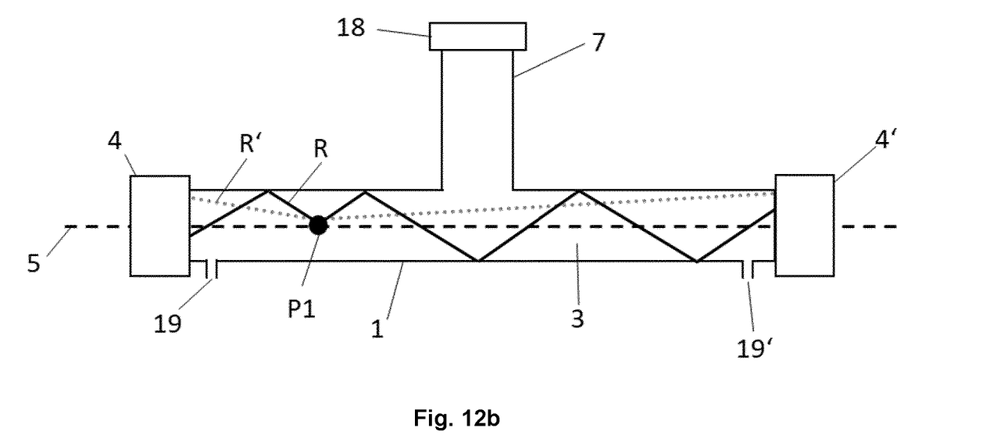
FIG. 12b shows an alternative design of FIG. 12a in which the detector or the detector/reflector is fixedly connected to the scintillation cuvette.

FIG. 12 shows a system 1.1 according to one exemplary embodiment of the present invention, which may be used in a conventional LSC device, for example for measuring $^{14}C$ in a combustible solid sample. In the example of the method shown, in a first step the radioactive sample is subjected to a physical and chemical separation process (preanalytics such as catalytic combustion for $^{14}C$). The sample thus prepared in advance is added to the scintillation medium as described above (in the example: $^{14}C$; scintillator is a $CO_2$ absorber). The scintillation medium together with the sample is preferably placed directly in a liquid light guide or mixed directly in same.

The liquid light guiding scintillation cuvette 1 may preferably have the shape of an upside-down T-piece. The system 1.1 in the exemplary embodiment of the present invention shown here has no distributor as in FIG. 10, for example. The upwardly pointing outlet 7 is used here to fill the scintillation cuvette 1, and the two optical outlets 12 are used as windows 6 and are aligned with the respective detectors 4 and 4'.

For example, ultrapure quartz glass may be used as a window 6. The absorption of the mixed sample preferably takes place via simple infusion, penetration via injection or capillary forces, or via diaphragm pumps, centrifugal pumps, or peristaltic pumps.

The windows 6 are preferably fixed directly to the scintillation cuvette 1 and/or fixed to the detectors 4 and 4'. The system to be selected depends on the type of detectors 4, 4' used. The objective in using the windows 6 should be to keep the introduction of further optical interface transitions between the liquid light guide and the detector 4, 4' as low as possible.

In this regard, the design of the light guides may vary:
a) A light guide as a replaceable sample container, which is separately closed via a window 6 downstream from all optical outlets. As a result, losses in the optical interface transition occur. In this design, it would be possible to automatically change samples, for example using a revolver system.

b) A light guide that is fixedly installed in the measuring device 1.1. This means that the detector 4, 4' itself represents the closure of the light guide, resulting in sparing of further optical transitions. In this design, supplying of the sample would take place directly via diaphragm pumps, centrifugal pumps, or peristaltic pumps. The number of optical outlets 12 from the scintillation cuvette 1 may vary between one outlet and multiple outlets (also more than two).

Coincidence circuits including two detectors 4, 4' or circuits including a detector 4 and an external or internal reflector 4' may preferably be used for the measurement. The optical outlets may be present individually or as a bundle.

Just upstream from the optical outlets, the liquid light guide is preferably provided in each case with a flushing gate 19 and 19'. These flushing gates 19, 19' may be closed liquid-tight. For example, FEP or PTFE stoppers may be used to minimize the optical losses that occur at the flushing gates 19, 19'. After measurement is completed, these flushing gates 19, 19' are preferably used to clean the scintillation cuvette 1 by flushing with various cleaning substances.

The $^{14}C$ measuring cocktail containing the sample and the scintillation medium and kept in the scintillation cuvette 1 scintillates, and the resulting fluorescence emissions, i.e., the scintillation light, are/is guided to the detector(s) 4, 4'. A better signal is detectable at the detector(s) 4, 4', based on the improvement in the instrument-related quantum yield that is generated.

For correction of the quenching, an external radionuclide or the SIS method may be used at the same time. In measuring areas with high external ionizing radiation, lead shields or monitoring detectors may also be used. The minimization of the quenching is accompanied by a broadening of the spectra toward higher channels. The signal is preferably subsequently subjected to a mathematical evaluation procedure, for example using beta end-point determination and/or maximum band positions for a discrimination of the individual spectra of various emitting nuclides.

The design in FIG. 12 may also be used to check the activity of depleted radioactive samples or samples suspected of radioactivity shortly before their final disposal or release. An incorporation of the system 1.1 into a process chain is also preferably provided. Conversely, the measuring device may also be used to monitor radioactive enrichment processes. For example, the $^{14}CO_2$ that arises during the combustion in the above example is led into the scintillation cell via the opening 7, and the $^{14}CO_2$ absorption is observed via the count rate.

LIST OF REFERENCE SYMBOLS 1.1 system
1 scintillation cuvette
1.6 sample holder
1.6' second side of the sample holder
1.7 shield
2 jacket
2' additional reflector
3 scintillation medium
4 detector
4' further detector or reflector
1.5 liquid light guide
5 optical axis
5' further liquid light guide
6 window
7 opening
8 distributor 9 sealing ring
10 window mounting
11 mounting for detector or coupling optics
12 opening for detector or coupling optics
13 housing
14 internal reference nuclide
15 (first) monitoring detector
15' second monitoring detector
16 monitoring cell with scintillator, similar to scintillation cuvette 1 but without sample
17 optical shield
18 closure cap
19 first flushing gate
19' second flushing gate
H main plane of extension
R beam path with liquid light guide
R' beam path without liquid light guide
P1, P2 scintillating point sources

The invention claimed is:

1. A scintillation cuvette for measuring ionizing radiation, the scintillation cuvette comprising:
a light guide structure for guiding scintillation light within the scintillation cuvette, the light guide structure having a light guide wall having a first refractive index;
a window having a second refractive index, the first refractive index being lower than the second refractive index; and
a scintillation medium situated in the scintillation cuvette, the scintillation medium having a predefined refractive index that is higher than the first refractive index,
wherein the scintillation cuvette is configured to be situated in a sample holder.

2. The scintillation cuvette according to claim 1, wherein the light guide wall is suitable for a total reflection of the scintillation light in a direction of the window, the light guide wall being provided as a jacket of the light guide structure.

3. The scintillation cuvette according to claim 1, wherein the scintillation cuvette is permeable to the scintillation light, at least in a region of the window, the scintillation cuvette being a scintillation flask.

4. The scintillation cuvette according to claim 1, wherein the light guide wall is formed by a circumferential shell surface of the scintillation cuvette.

5. The scintillation cuvette according to claim 1, wherein the light guide wall is situated at least partially inside of the scintillation cuvette.

6. The scintillation cuvette according to claim 1, wherein the window is formed by an end-face surface of the scintillation cuvette.

7. The scintillation cuvette according to claim 1, wherein the scintillation cuvette includes at least one further light guide structure with a light guide wall and/or a further light guide wall, the further light guide wall having a lower refractive index than the window and/or a further window, the light guide wall being provided as a jacket of a light guide, the light guide wall and/or the further light guide wall being provided as a jacket of a further light guide, the at least one further light guide structure being situated in parallel to the light guide.

8. The scintillation cuvette according to claim 7, wherein the scintillation medium is situated at least partially inside the light guide wall and/or the further light guide wall, a liquid light guide or a further liquid light guide being formed by the scintillation medium and the light guide wall and/or the further light guide wall.

9. The scintillation cuvette according to claim 7, wherein the light guide wall is provided as the jacket of the light guide, and additional reflective elements are situated around the light guide and/or around the further light guide.

10. The scintillation cuvette according to claim 1, wherein the scintillation cuvette has a main direction of extension, the light guide wall being provided as a jacket of the light guide structure, and the light guide being situated in parallel to the main direction of extension.

11. A system for detecting ionizing radiation, comprising:
the scintillation cuvette according to claim 1 located within the sample holder, wherein the scintillation medium is situated in the scintillation cuvette, and a detector arranged for detecting the scintillation light that exits from the window.

12. The system according to claim 11, wherein the system includes the sample holder, the sample holder having an opening at its first side facing the detector, the sample holder including a reflector, at least at its second side opposite from the first side, for reflecting the scintillation light.

13. The system according to claim 11, wherein the detector includes a silicon photomultiplier.

14. The system according to claim 11, wherein the system includes a further detector, the scintillation cuvette being situated between the detector and the further detector.

15. The system according to claim 11, wherein the system includes a reference nuclide for calibrating measured values.

16. The system according to claim 11, wherein the system includes a shield or a lead shield surrounding the detector and the sample holder.

17. The system according to claim 11, wherein the system includes a monitoring detector for measuring external ionizing radiation.

18. The scintillation cuvette according to claim 1, wherein the second refractive index is higher than the predefined refractive index of the scintillation medium.

19. The scintillation cuvette according to claim 1, wherein the light guide wall is formed by a circumferential shell surface located within the scintillation cuvette, and the window is formed by an end-face surface of the scintillation cuvette and faces in a direction of a detector that is configured to detect the scintillation light that exits from the window.

20. The scintillation cuvette according to claim 1, wherein the light guide structure having the light guide wall for guiding the scintillation light within the scintillation cuvette is located within the scintillation cuvette.

* * * * *